(12) United States Patent
Hung et al.

(10) Patent No.: US 7,972,014 B2
(45) Date of Patent: Jul. 5, 2011

(54) SCANNING PROJECTION APPARATUS WITH PHASE DETECTION AND COMPENSATION

(75) Inventors: Chang-Li Hung, Taipei (TW); Ta-Wei Lin, Taipei (TW)

(73) Assignee: Opus Microsystems Corporation, Taipei (TW)

( * ) Notice: Subject to any disclaimer, the term of this patent is extended or adjusted under 35 U.S.C. 154(b) by 275 days.

(21) Appl. No.: 12/186,234

(22) Filed: Aug. 5, 2008

(65) Prior Publication Data
US 2010/0033691 A1 Feb. 11, 2010

(51) Int. Cl.
*G03B 21/14* (2006.01)
(52) U.S. Cl. .......................................................... 353/69
(58) Field of Classification Search .................... 353/94, 353/30, 31, 69, 70; 359/96.1, 98.1, 196.1, 359/198.1
See application file for complete search history.

(56) References Cited

U.S. PATENT DOCUMENTS

| | | | | |
|---|---|---|---|---|
| 6,937,372 B2* | 8/2005 | Kandori et al. | ............ | 359/198.1 |
| 7,239,436 B2* | 7/2007 | Oettinger et al. | .......... | 359/213.1 |
| 2008/0158632 A1* | 7/2008 | Yamazaki | ..................... | 359/202 |

* cited by examiner

*Primary Examiner* — Thanh X Luu
(74) *Attorney, Agent, or Firm* — Muncy, Geissler, Olds & Lowe, PLLC

(57) ABSTRACT

A scanning projection apparatus for displaying image comprises a light source for generating a light beam, a beam scanner which deflects the light beam to project a two dimensional image field, a modulation means for modulating the intensity of the light beam, and a sensor to detect the scanned light beam. The light source may consist of a plurality of semiconductor lasers and/or solid state lasers to generate light beams with wavelengths of red, green and blue colors aligned into a single light path. The image field is divided into an active image field for displaying image and a dark field in the perimeter of the image field wherein the light beam is switched off to reduce inherent image defects. The sensor is positioned outside the active image field to detect a scan line once per image frame to eliminate image distortion due to phase difference between the actual and the predicted positions of the scanned beam, and to detect both the horizontal and the vertical scanning operations of the beam scanner for safety precaution.

20 Claims, 11 Drawing Sheets

SCANNING PROJECTION APPARATUS WITH PHASE DETECTION AND COMPENSATION

BACKGROUND OF THE INVENTION

The present invention relates generally to scanning projection apparatuses and more particularly relates to light beam scanning projection displays with phase detection and compensation between the timing of modulating the light beam and the position of the scanned light beam.

In a scanning projection display, a collimated light beam is deflected about two orthogonal axes to move across an image field by either one beam scanner with bi-axial scanning capability or by two single axis beam scanners with their scan axes aligned perpendicular to each other. An image field can be established by sweeping the light beam either in raster pattern or in Lissajous pattern. Images, texts or patterns can be formed over the image field by determining light beam position and modulating the power of the light beam to form desired image pixels according to the received image or video information.

In order to make a compact image projection system, micromechanical scanning mirror is typically employed as the beam scanner. Electrical drive signals such as alternating voltage or alternating current are applied to the beam scanner to generate mechanical oscillation of the mirror. The beam scanners may be operated on or near their resonant frequencies to obtain maximum mechanical gain or large scan angle in bi-directional motion with sinusoidal scan trajectories. For raster scan system, the horizontal scanning motion is typically sinusoidal at a high frequency depending on image resolution while the vertical scanning motion is a controlled sawtooth motion at 50 Hz or 60 Hz depending on image refresh rate. For Lissajous scan system, both the horizontal and the vertical scanning motions are sinusoidal with a carefully chosen frequency ratio such that a stable and repeatable scan pattern can be achieved.

In order to project a scanned image, the correct position of the deflected light beam needs to be determined such that the light beam can be modulated to form desired image pixels according to received image information. For sinusoidal scanning, one can calculate the light beam position relative to the scan trajectory based on mathematical equation of sinusoidal motion once the scan frequency and the timing of crossover, the timing when the light beam passing through the center of the scan span, are known. For micromechanical oscillator, the oscillation frequency is directly related to the frequency of the drive signal; however, the timing of crossover is related to the damping and the change of resonance frequency which depend on conditions of the operating environments such as temperature, moisture, air pressure, and etc. If the beam scanner is operated at a fixed frequency near the resonance frequency, a slight change in the resonance frequency will cause phase change between the drive signal and the oscillation motion of the beam scanner. In order to form image pixel in the correct location, the timing of modulating the light beam needs to be adjusted accordingly. The projected image pixels will become displaced and distorted if the phase difference between the timing of modulating the light beam and the position of the scanned light beam is not compensated correctly.

Furthermore, human eye safety is a primary concern in a front projection apparatus employing light beam scanning schemes because high output power of the light source is required to generate image with enough brightness. For safety precaution, it is necessary to detect whether the light beam is scanned by the beam scanner to disperse the light source power over a scanned image field or not. If the beam scanner is malfunctioned, the light beam must be switched off to ensure safety operation. Thus, it is critical to provide a measure to detect whether the beam scanner is in normal operation condition and the light beam power is dispersed over an image field.

Therefore, it is the object of the present invention to provide a light beam scanning projection apparatus with improved image quality by detecting and compensating the phase error between the timing of modulating the light beam and the position of the scanned light beam, and to provide a safety measure for detecting both the horizontal and the vertical oscillation of the beam scanner.

SUMMARY OF THE INVENTION

The projection apparatus according to the present invention includes a beam scanner having a reflective surface that reflects and scans a light beam to form a two dimensional image field. The light beam is scanned bi-directionally in the horizontal direction. The light beam may be generated by a plurality of light sources consisting of semiconductor lasers and/or solid state lasers to have wavelengths of red, green and blue colors aligning into a single path. In order to reduce inherent image defects such as pinched scan lines and higher brightness due to returning of scanning motions at the extremes of the scan span, the light beam is switched off in the perimeter of the image field which is defined as dark field for explanation purpose in the present invention. Thus, the image field consists of an active image field for projecting image and a dark field for reducing inherent image defects. A sensor capable of detecting the scanned light beam is disposed outside the active image field but near the vertical extreme of with at least part of its sensing area inside the dark field, and a horizontal scan line, "feedback scan line" is generated by switching on the light beam of selected wavelength within specific period of time to shine on the sensor once per image frame. The phase difference between the actual and the predicted positions of the scanned beam can be determined based on detection of the electrical signals received from the sensor and reference timing of initiating the feedback scan line. Modulation of light beam to form image pixels at desired location can then be synchronized with the scanning motion of the light beam. If the beam scanner is malfunctioned in vertical scanning, the feedback scan line will not sweep over the sensor since the sensor is positioned near the vertical extreme of the image field. If the beam scanner is malfunctioned in horizontal scanning, the feedback scan line will not sweep over the sensor in a periodic fashion. Thus, the sensor along with the feedback scan line is capable of detecting the malfunction of the beam scanner in both the horizontal and the vertical scanning motions.

In a preferred embodiment of the present invention, a sensor is positioned on an arbitrary location except the extremes and the middle of the horizontal scan span and near the vertical extreme of the dark field. A feedback scan line is switched on for shorter than or equal to a half period of a horizontal scan cycle to shine on the sensor for phase detection.

In one embodiment, a sensor is positioned along the center of the horizontal scan span and near the vertical extreme of the dark field. A feedback scan line is switched on for shorter than or equal to a half period of a horizontal scan cycle to shine on the sensor for phase detection.

In another embodiment, an additional light source in the display apparatus is dedicated to generate only the feedback scan line away from the active image field. A sensor is positioned such that the feedback scan line shines on its sensing area once per image frame.

DETAILED DESCRIPTION OF THE PREFERRED EMBODIMENTS

Figure 1:
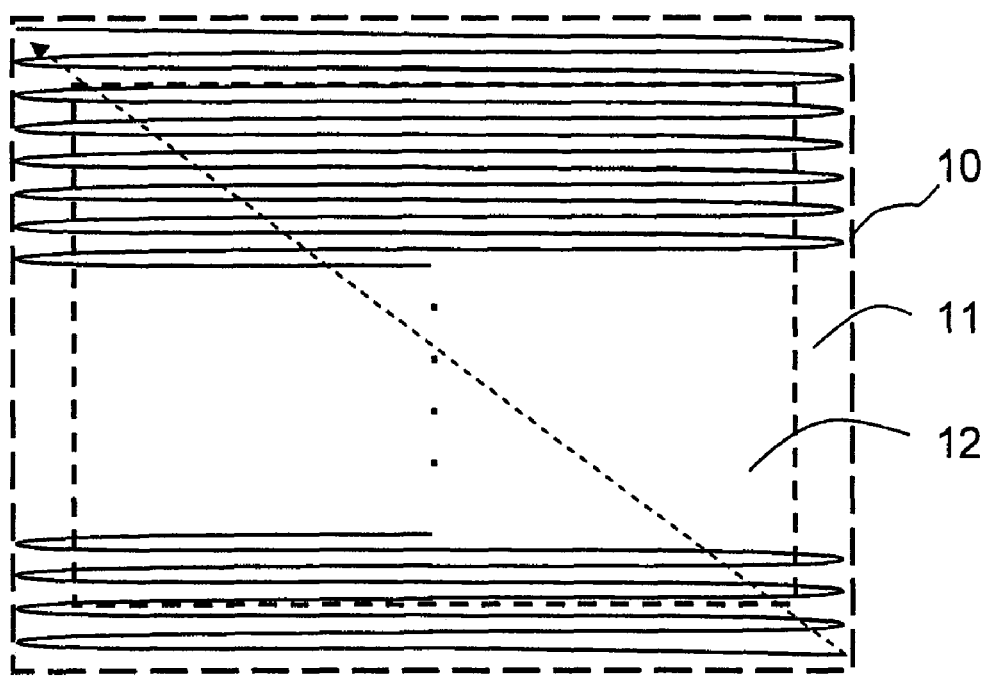
FIG. 1 shows an image field formed by raster scanning of a light beam with horizontal scanning in bi-directional and sinusoidal motion.

FIG. 1 illustrates a two dimensional image field 10 formed by raster scanning of a light beam with the horizontal scanning in bi-directional and sinusoidal motion. Bi-directional and sinusoidal scanning motion in horizontal direction is typically the case when a micromechanical scanning mirror is used as the beam scanner to deflect the light beam. To start projecting the next image frame, the light beam needs to perform a fly back or a vertical retrace motion by moving the light beam from the lower right corner to the upper left corner of the image field. In order to reduce inherent image defects such as pinched scan lines and higher image brightness due to returning of the bi-directional scan motion, the scanned light beam is typically deliberately switched off in the perimeter of the image field, defined as dark field 11. The region inside the dark field is used for displaying projected image and is defined as the active image field 12.

Figure 2:
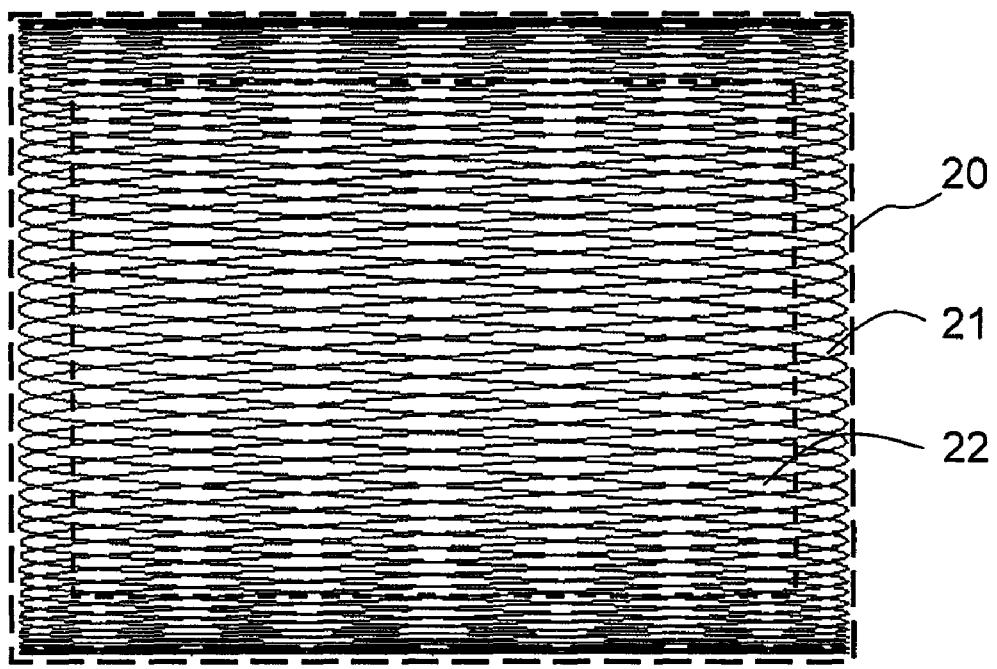
FIG. 2 shows an image field formed by Lissajous pattern scanning of a light beam with 52:5 as the frequency ratio between the horizontal and the vertical scanning motions.

For scanning display with Lissajous pattern, both the horizontal and the vertical scanning motions of the light beam are bi-directional and sinusoidal, and the frequency ratio between the horizontal and the vertical scanning is selectively chosen to achieve a stabilized scan pattern. FIG. 2 shows a Lissajous pattern with 52:5 as the frequency ratio between the horizontal and the vertical scanning motions. By increasing the scan line density, Lissajous scan pattern can also be used to display image with desired resolution similar to raster scanning. The image field 20 can be divided into a dark field 21 and an active image field 22 by switching off the light beam in the perimeter of the image field to reduce inherent image defects.

Figure 3A:
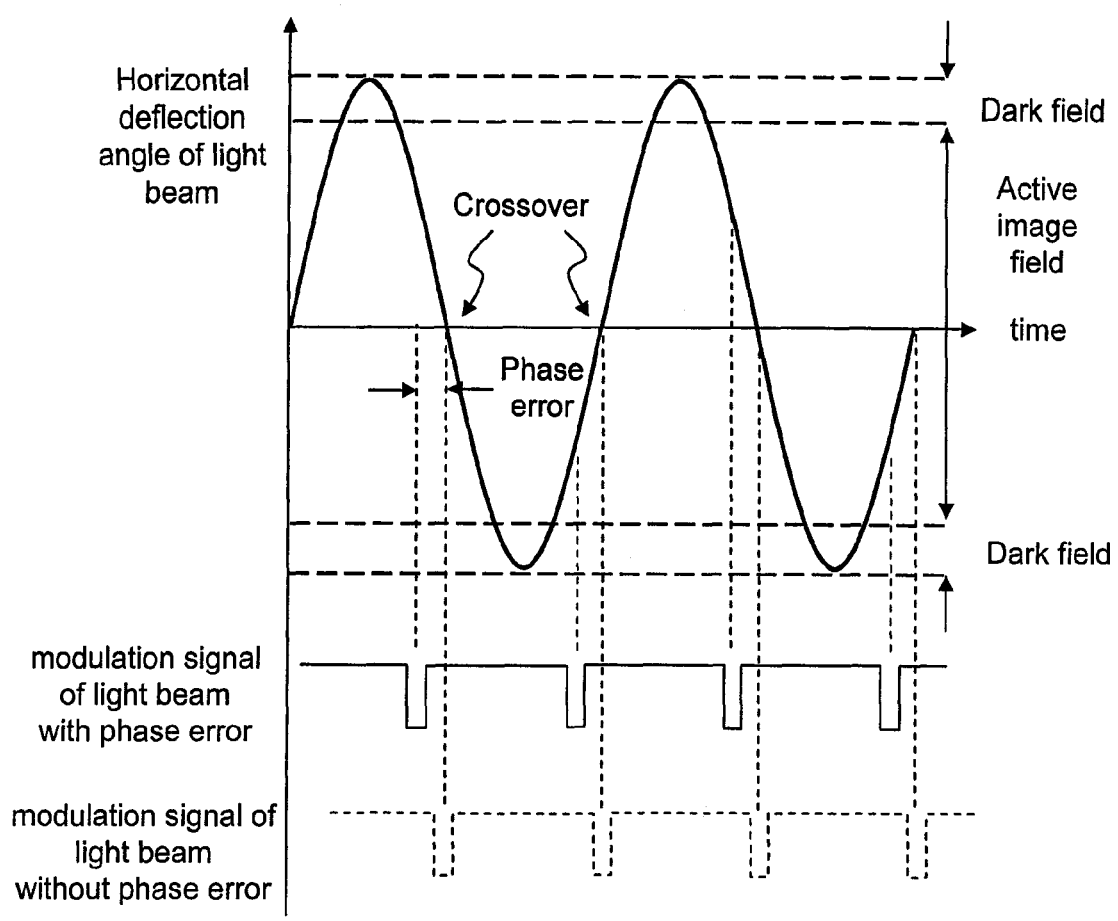
FIG. 3A illustrates a bi-directional and sinusoidal motion of a deflected light beam and the associated modulation signal of the light beam to generate image pixels along the center of the image field.
Figure 3B:
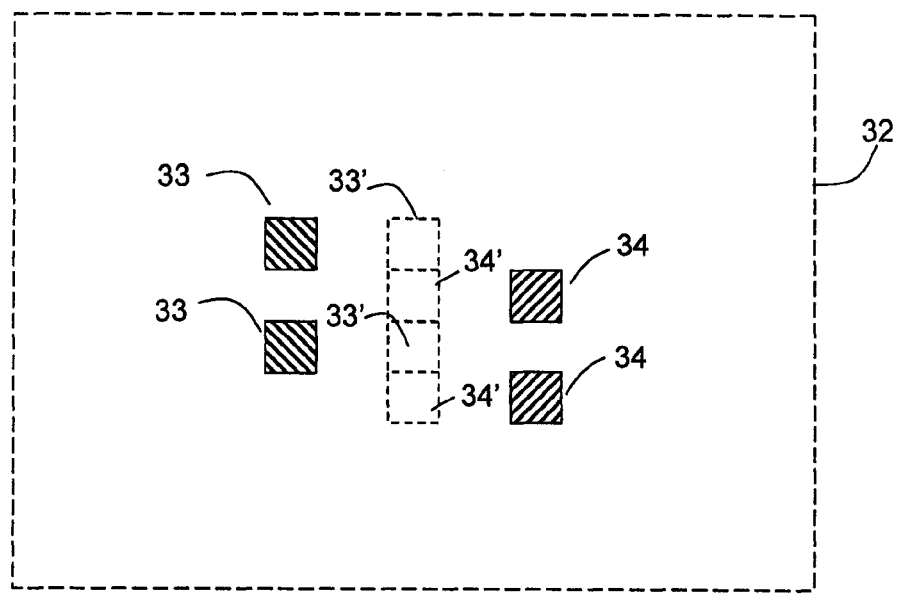
FIG. 3B illustrates dislocated pixels along the center of an image field due to phase error between the timing of light beam modulation and timing of crossover of the scanned light beam.

FIG. 3A and FIG. 3B demonstrate that the projected image of a light beam scanning display may be distorted when the exact location of the light beam is not determined correctly. FIG. 3A illustrates a bi-directional and sinusoidal motion of the deflected light beam and the associated modulation signal of the light beam to generate image pixels along the center of the active image field 32. The light beam will be switched off if the modulation signal is in high level and vice versa. In order to generate image pixels along the center of the image field, the light beam must be switched on for a certain period of time while the scanning motion is crossing over the center of the image field 32. If there is a phase error between the timing of the modulation signal, solid line in FIG. 3A and the crossover defined as the timing when the light beam passes through the center of the deflection span, the resulted pixels 33, 34 will be dislocated from the center of the active image field 32 as depicted in FIG. 3B. If the phase error between the timing of the modulation signal, represented by dashed line in FIG. 3A, and the crossover of the scanning motion is compensated, the pixels 33', 34' will be in the center of the image field 32 as shown in FIG. 3B. Therefore, one needs to compensate the phase error between the timing of light beam modulation and the scanning position of the deflected light beam in order to display image pixels in the correct locations. For light beam projection apparatus with bi-directional and sinusoidal scanning, one can predict the relative light beam location on the sinusoidal trajectory once the timing of crossover is known as long as the scan frequency is known even if the scanning angle of the beam scanner may be changed due to environmental factors such as operating temperature.

Figure 4:
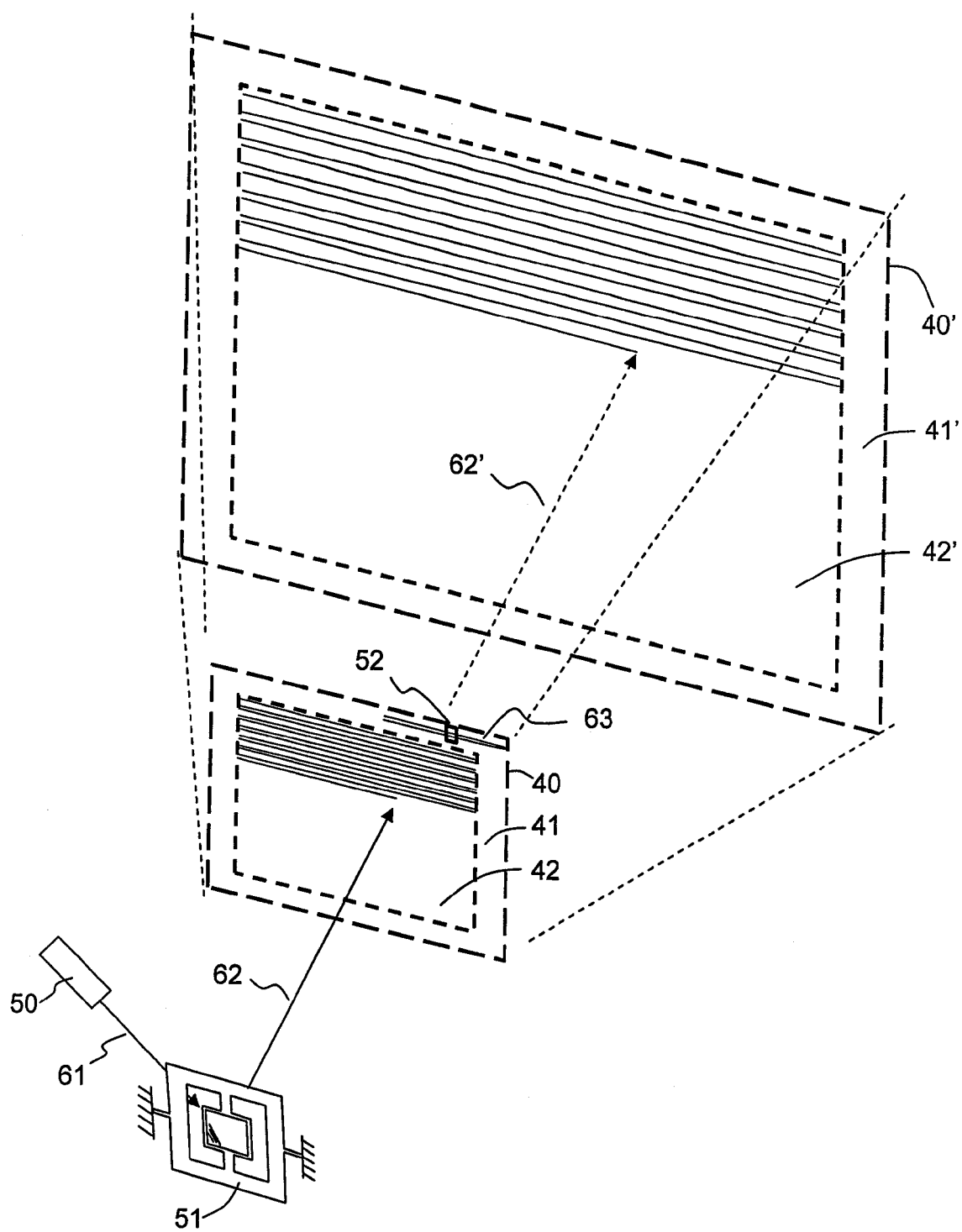
FIG. 4 is a perspective view of a projection display apparatus according to the first embodiment of the present invention.

FIG. 4 illustrates a perspective view of a projection apparatus according to the first embodiment of the present invention. A light beam 61 generated by a light source 50 is deflected about two deflection axes of a beam scanner 51 in back and forth motion to project and scan over a two dimensional image field 40 inside the projection apparatus. Although the light beam, as depicted in FIG. 4, is represented by a single beam 61, the light source 50 may consist of a plurality of semiconductor lasers and/or solid state lasers to generate light beams of wavelengths of red, green and blue colors which are aligned into a single light path, and the beam scanner 51, represented as a single beam scanner with two orthogonal deflection axes, may be replaced by two single axis beam scanners with the first beam scanner provides horizontal scanning and the second beam scanner provides vertical scanning of the light beam 62. The horizontal deflection of the light beam 62 is in sinusoidal and bidirectional motion, for example by operating the beam scanner 51, such as a micromechanical oscillator, in resonance about its horizontal deflection axis. The vertical deflection of the light beam 62 can be in either sinusoidal motion or sawtooth motion about its vertical deflection axis depending on the operation of the beam scanner 51. The scanned light beam 62 is deliberately switched off in the perimeter of the image field, defined as dark field 41, in order to reduce inherent image defects such as pinched scan lines and higher image brightness due to returning of scanning motion, and the rest of the image field is defined as the active image field 42 for displaying projected image. The image field 40 is consisted of an active image field 42 and a dark field 41. A sensor 52, such as a photodiode or a silicon PIN diode, capable of detecting the scanned light beam is positioned near the vertical extreme of the dark field 41 but outside the active image field 42 at a distance from the beam scanner 51 inside the projection apparatus.

The deflected light beam 62 is switched on for a specific period of time within the dark field 41 to generate a scan line, defined as the feedback scan line 63 to sweep over the sensor 52. The sensor 52 and the feedback scan line 63 are used to detect and to compensate the timing of crossover of the scanned light beam once per image frame. The feedback scan line 63 can be blocked by various means such as a square aperture inside the projection apparatus such that only the active image field 42 is projected out of the projection apparatus to form an active image field 42' at a farther distance.

If the beam scanner 51 is malfunctioned in vertical scanning, the feedback scan line 63 will not sweep over the sensor 52 and no detection signal is generated from the sensor 52 since the sensor 52 is positioned near the vertical extreme of the image field 40. If the beam scanner 51 is malfunctioned in horizontal scanning, the feedback scan line 63 will not sweep over the sensor 52 in a periodic fashion and no detection signal is generated from the sensor 52. Thus, the sensor 52 along with the feedback scan line 63 is capable of detecting the malfunction of the beam scanner in both the horizontal and the vertical scanning motions. If the beam scanner 51 is malfunctioned in either the vertical scanning or the horizontal scanning operation, the active image field 40' will reduce to either a horizontal or a vertical scan line. Or in the worst case, the active image field 42' is reduced to a single light beam with concentrated power if the beam scanner 51 is malfunctioned in both the horizontal and the vertical scanning operation. For a front projection apparatus, the image field 40' is exposed to nearby viewers. Light beam with concentrated high power lead to eye safety concerns. Thus, the light beam 61 is switched off if no detection signal is generated from the sensor 52.

Figure 5A:
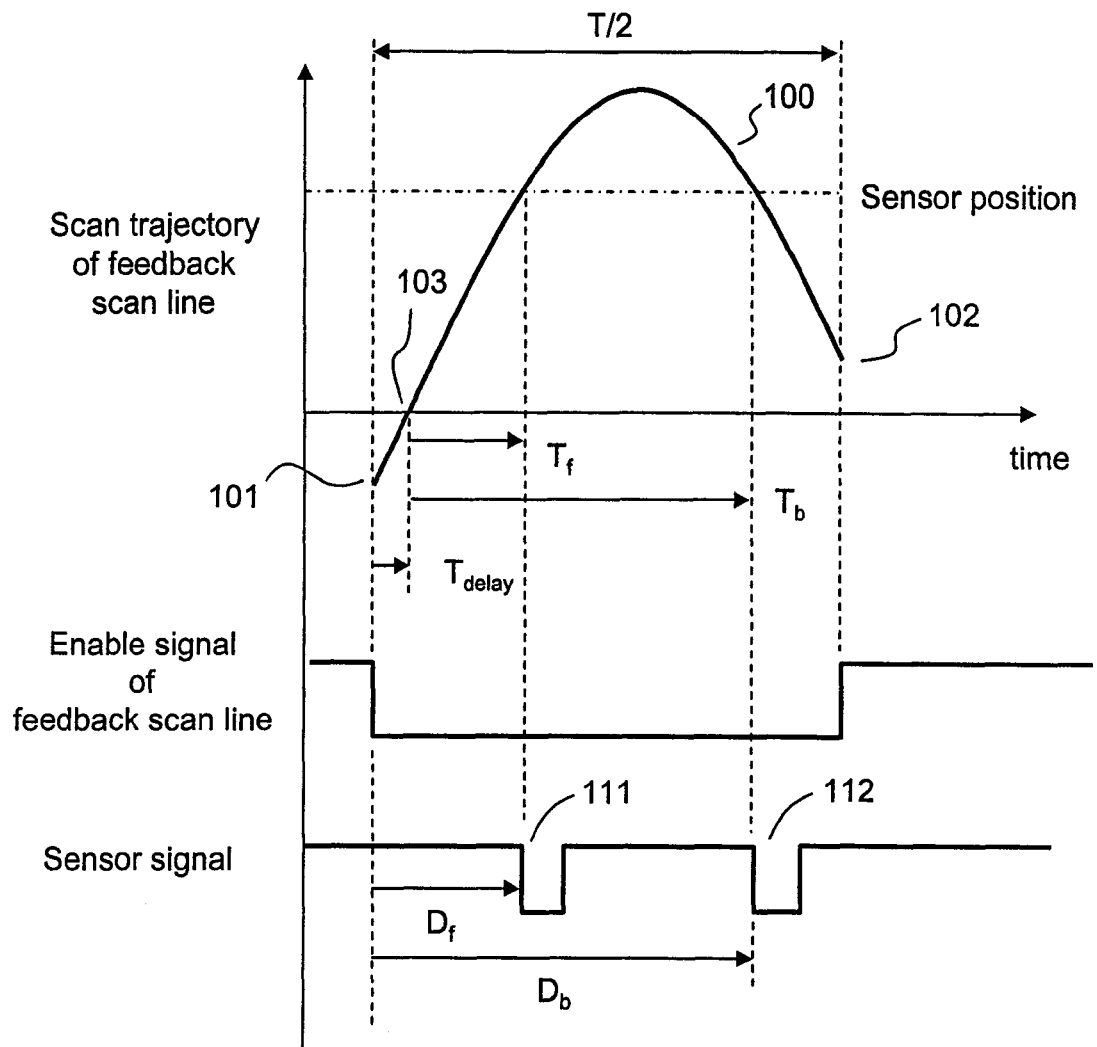
FIG. 5A illustrates a technique to detect the timing of crossover of the deflected light beam in bi-directional and sinusoidal motion with a sensor and a feedback scan line.
Figure 5B:
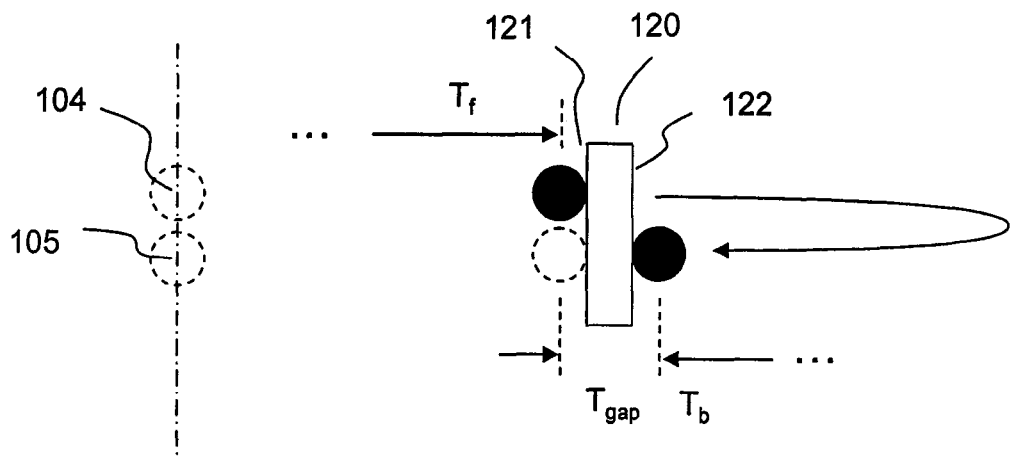
FIG. 5B is a schematic close-up view of the sensor and the associated time intervals to define the position of the scanned light beam.

FIGS. 5A and 5B illustrates a technique associated with the present invention to detect the timing of crossover of the deflected light beam in bi-directional and sinusoidal motion. A sensor 120, capable of detecting the scanned light beam is positioned on any location of the deflection span except on the extremes and the crossover point. A scan line for detecting the phase error, defined as the feedback scan line 100 is generated for a half period of the scanning cycle by pulling the enable or modulation signal of the light beam to low level from the predicted first crossover 101 to the predicted second crossover point 102 to switch on the light beam to shine on the sensor 120. The period of a complete scanning cycle is defined as T so the feedback scan line is turned on for time interval of T/2. The feedback scan line 100 passes through the first edge of the sensor 121 to generate the first electrical pulse signal 111. After passing through the sensor 120, the light beam continues to move to the extreme then returns and passes through the second edge of the sensor 122 to generate the second electrical pulse signal 112.

Referring to sensor signal in FIG. 5A, the time interval counting from the predicted first crossover 101 to the falling edge of the first pulse signal 111 can be recorded and is defined as $D_f$. The time interval counting from the predicted first crossover 101 to the falling edge of the second pulse signal 112 can be recorded and is defined as $D_b$. The time interval counting from the actual first crossover 103 to the falling edge of the first pulse signal 111 is unknown and is defined as $T_f$. The time interval counting from the actual first crossover 103 to the falling edge of the second pulse signal 112 is unknown and is defined as $T_b$. The phase error or the time difference between the predicted crossover 101 and the actual crossover 103 is to be determined and is defined as $T_{delay}$ such that $$D_f = T_{delay} + T_f$$

$$D_b = T_{delay} + T_b$$

FIG. 5B is a schematic close-up view of the sensor 120 and the associated time intervals to define the position of the scanned light beam. For the case without phase error, the deflected light beam starts from the first crossover 104 located in the center of the image field, passes through the first edge of the sensor 121 with time interval of $T_f$ and continues to move toward the extreme of the image field. After reaching the extreme, the light beam returns, passes through the second edge of the sensor 122 with time interval of $T_b$ and continues to move toward the second crossover 105 in order to complete a half period of the scan cycle. Since the sensor 120 has a fixed width of sensing area, the time interval T/2 equals to $$T/2 = T_f + T_b + T_{gap}$$

where $T_{gap}$ is related to the width of the sensing area of the sensor 120 and the spot diameter of the light beam as illustrated in FIG. 5B. Thus one can determine the phase error, $T_{delay}$ as $$T_{delay} = \tfrac{1}{2}(D_f + D_b + T_{gap}) - T/4$$

Since the scan frequency of the beam scanner is based on the frequency of the electrical drive signal, the period of the scan cycle, T is known a priori. The time intervals, $D_f$ and $D_b$ can be measured and recorded based on the modulation signal of the feedback scan line 100 and the electrical pulse signals of the sensor 111, 112. To determine the phase error $T_{delay}$, the only remaining unknown factor is $T_{gap}$. In practice, one can eliminate the phase error $T_{delay}$ by visually looking at the projected image and adjusting the phase difference manually or by projecting a test pattern and adjusting the phase difference automatically such that there is no image distortion during initial setup of the projection display apparatus. The time interval $T_{gap}$ can be determined according to the equation $$T_{gap}=T/2-(D_f+D_b); \text{ when } T_{delay}=0;$$

Time interval $T_{gap}$ is then recorded and stored in memory of the projection apparatus. The phase error $T_{delay}$ between the timing of predicted crossover 101 and the actual crossover 103 can be determined and automatically compensated with measured time intervals, $D_f$ and $D_b$ once per image frame. Once the actual crossover is determined, one can predict the light beam position along the scan trajectory and modulate the light beam to generate desired image pixels at the correct locations.

Figure 6A:
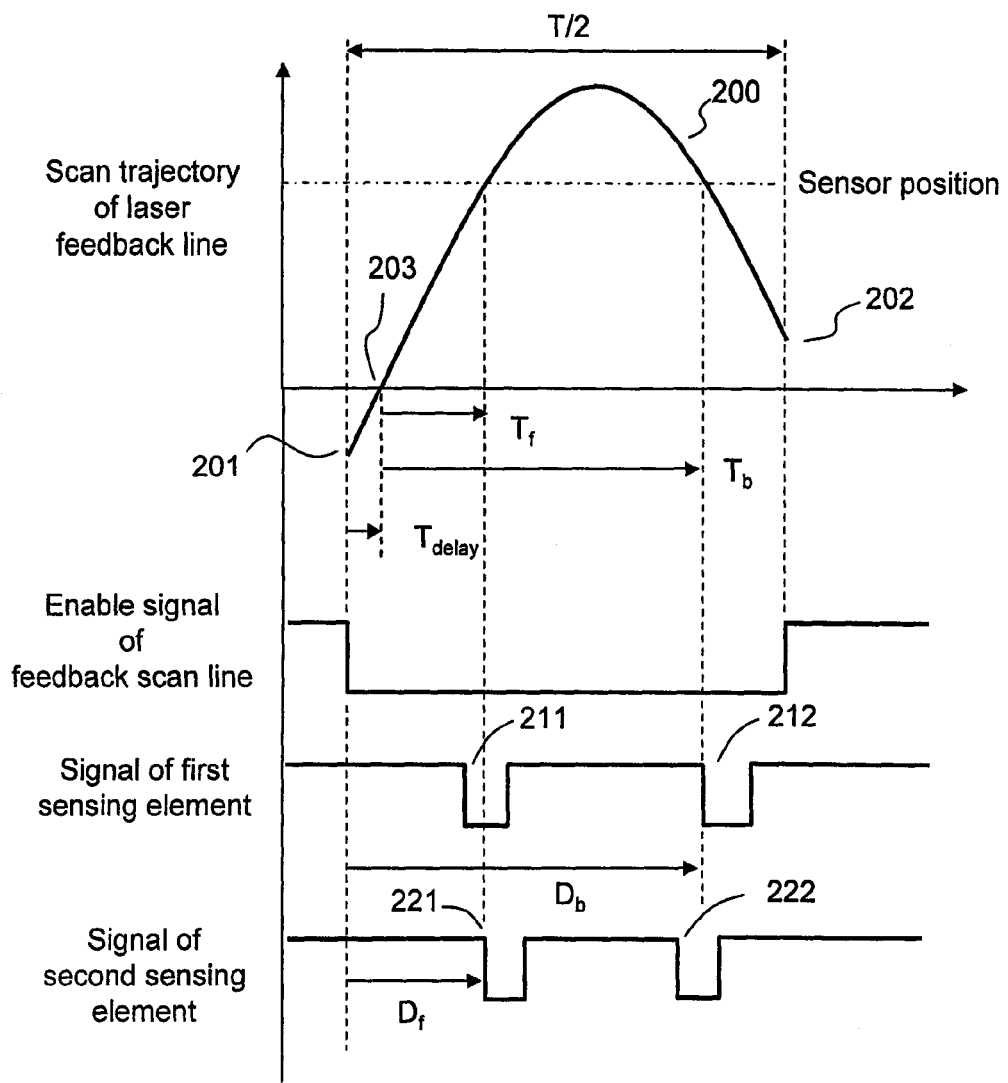
FIG. 6A illustrates a technique to detect the timing of crossover of the deflected light beam in bi-directional and sinusoidal motion with a dual element sensor and a feedback scan line.
Figure 6B:
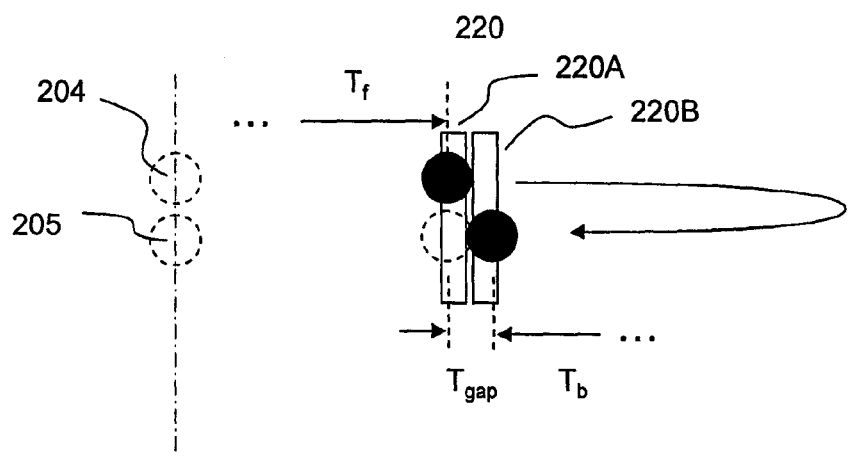
FIG. 6B is a schematic close-up view of the dual element sensor and the associated time intervals to define the position of the scanned light beam.

FIGS. 6A and 6B illustrates the technique to detect and compensate the phase error with a dual element photo-detector to minimize the effect of the width of sensing area. A dual element photo-detector 220 with a pre-determined space between the two sensing elements 220A, 220B is positioned on any location of the deflection span except on the extremes and the crossover point. A feedback scan line 200 is generated for a half period of the scanning cycle (T/2) by pulling the modulation signal of the light beam to low level from the predicted first crossover 201 to the predicted second crossover 202 to switch on the light beam to sweep over the photo-detector 220. The feedback scan line 200 passes through the left edge of the first sensing element 220A to generate an electrical pulse signal 211 then continues to scan over the left edge of the second sensing element 220B to generate an electrical pulse signal 221. After passing through the dual element photo-detector 220, the light beam continues to move to the extreme then returns toward the center of the image field. The scan line continues to pass through the right edge of the second sensing element 220B to generate an electrical pulse signal 222 then move toward the right edge of the first sensing element 220A to generate another pulse signal 212.

Referring to sensor signal in FIG. 6A, the time interval counting from the predicted first crossover 201 to the first falling edge of pulse signal 221 of sensing element 220B can be recorded and is defined as $D_f$. The time interval counting from the predicted first crossover 201 to the second falling edge of pulse signal 212 of the first sensing element can be recorded and is defined as $D_b$. The time interval counting from the actual first crossover 203 to the falling edge of the pulse signal 221 is unknown and is defined as $T_f$. The time interval counting from the actual first crossover 203 to the falling edge of pulse signal 212 is unknown and is defined as $T_b$. The phase error or the time difference between the predicted crossover 201 and the actual crossover 203 is to be determined and is defined as $T_{delay}$ such that $$D_f=T_{delay}+T_f$$

$$D_b=T_{delay}+T_b$$

FIG. 6B is a schematic and close-up view of the dual element photo-detector 220 and the associated time intervals to define the position of the scanned light beam. For the case without phase error, the deflected light beam starts from the first crossover 204 located in the center of the image field, passes through the left edge of the second sensing element 220B with time interval of $T_f$ and continues to move toward the extreme of the image field. After reaching the extreme, the light beam returns, passes through the right edge of the first sensing element 220A with time interval of $T_b$ and continues to move toward the second crossover 205 in order to complete a half period of the scan cycle. The space between the two sensing elements 220A, 220B of the dual element photo-detector 230 is selectable and is in the range of only a few micrometers. For laser scan display, the light spot diameter is typically at least two orders of magnitude larger than the space between the two sensing elements 220A, 220B; therefore, the effect of this space on phase error detection is negligible if the spot diameter of the light beam is maintained constant. The time interval T/2 equals to $$T/2=T_f+T_b+T_{gap}$$

where $T_{gap}$ is related to the spot diameter of the light beam as illustrated in FIG. 6B. Thus one can determine the phase error, $T_{delay}$ as $$T_{delay}=\tfrac{1}{2}(D_f+D_b+T_{gap})-T/4$$

The time intervals, $D_f$ and $D_b$ can be measured and recorded based on the modulation signal of the feedback scan line 200 and the two electrical pulse signals 221, 222. During setup of the projection display apparatus, one can adjust the phase such that there is no image distortion or phase error, and determine the time interval $T_{gap}$ according to the equation $$T_{gap}=T/2-(D_f+D_b); \text{ when } T_{delay}=0;$$

Time interval $T_{gap}$ is then recorded and stored in memory of the projection apparatus. The phase error $T_{delay}$ between the timing of predicted crossover 201 and the actual crossover 203 can be determined and automatically compensated with measured time intervals, $D_f$ and $D_b$ once per image frame.

Figure 7:
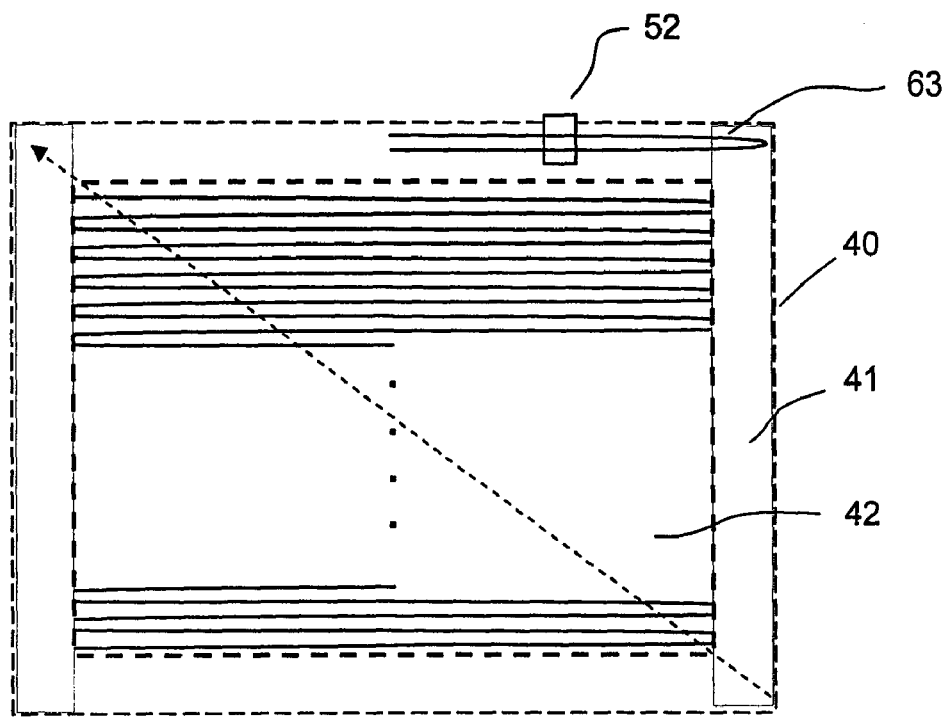
FIG. 7 illustrates a plan view of an image field formed by raster scanning of a light beam with a sensor positioned outside the active image field and a feedback scan line generated inside the dark field for compensating the phase error.

FIG. 7 illustrates a plan view of the image field 40, formed by raster scanning of a light beam with a sensor 52 and a feedback scan line 63 for compensating the phase error related to the first embodiment of the present invention as described in FIG. 4. The horizontal scanning trajectory of the light beam is bi-directional and sinusoidal and the image field is redrawn with a fly back motion of the light beam after moving constantly downward to the bottom of the image field 40. The light beam is deliberately switched off in the perimeter of the image field to form an active image area 42 and to reduce inherent image defects such as pinched scan lines and higher brightness due to returning motion of the light beam. The sensor 63 is positioned near the vertical extreme of the dark field 41 but outside the active image field 42 at a distance from the beam scanner 51. The feedback scan line 63 is switched on inside the dark field 41 for a half period of the scan cycle to shine on the sensor. The feedback scan line 63 can be blocked by various means inside the projection apparatus such that it is invisible to the viewer. According to the techniques described above, the sensor 63 can be located on any position except the extremes of the feedback scan line to allow compensating the phase error between the predicted and the actual positions of the light beam.

Figure 8:
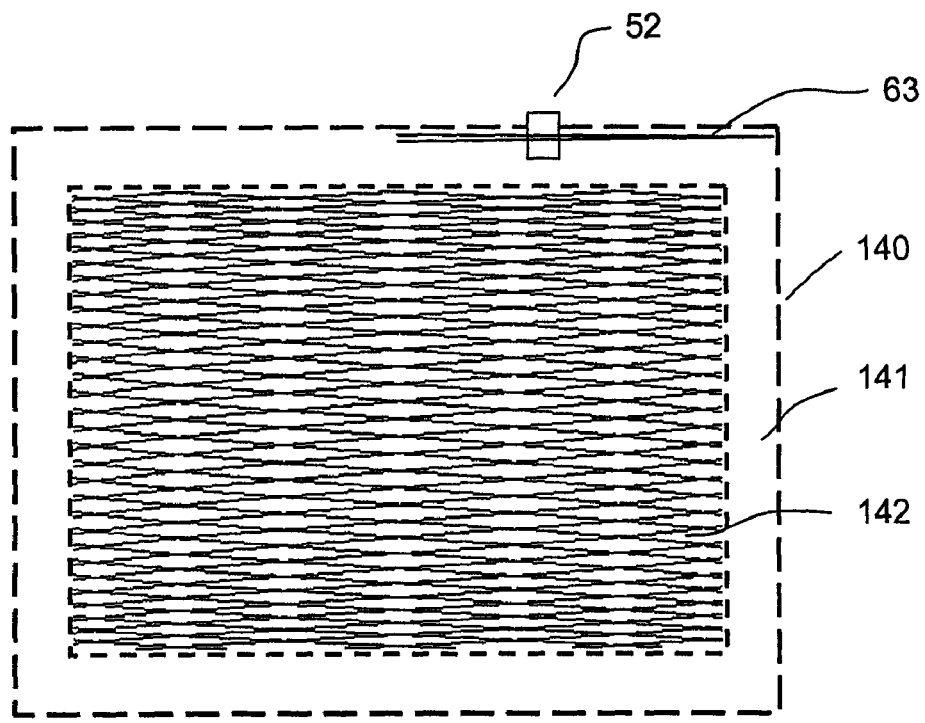
FIG. 8 illustrates a plan view of an image field formed by Lissajous scanning pattern of a light beam with a sensor positioned outside the active image field and a feedback scan line generated inside the dark field for compensating the phase error.

FIG. 8 illustrates an image field 140 formed by Lissajous scanning pattern with a sensor 152 positioned near the vertical extreme of the dark field 141 but outside the active image field 142, and a feedback scan line 163 for compensating the phase error. The image field 140 shares the same scan pattern of the image field 20 as shown in FIG. 2 with frequency ratio between the horizontal and the vertical scanning equals to 52:5 except that the light beam is switched off in the perimeter of the image field 140 and a feedback scan line 163 is switched on for a half period of the horizontal scan. The feedback scan line 163 is switched on from the nineteenth cycle of the horizontal scan counting from the center of the image field 140 such that the feedback scan line 163 is located within the dark field 141. Due to the high frequency ratio between the horizontal and the vertical scan, the generated feedback scan line 163 is nearly horizontal and similar to the feedback scan line 63 of raster scan pattern in FIG. 7.

Figure 9:
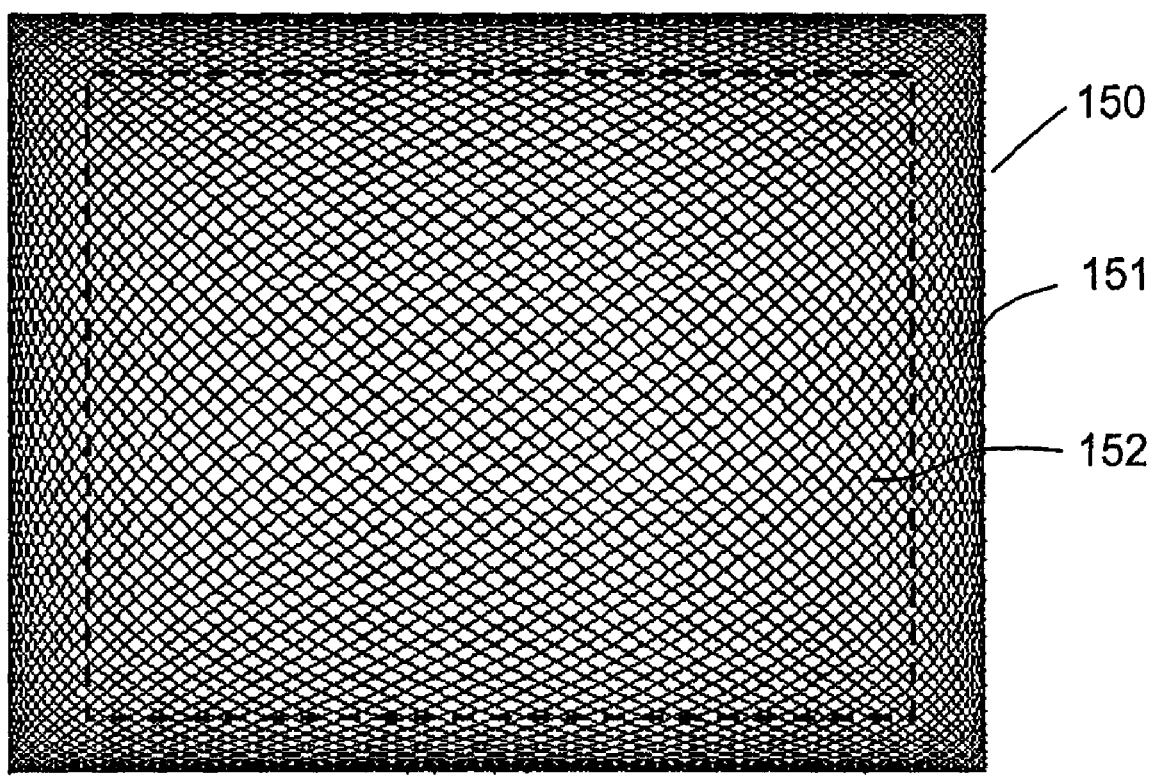
FIG. 9 illustrates an image field formed by Lissajous scanning pattern with frequency ratio between the horizontal and the vertical scanning equals to 52:51.

FIG. 9 illustrates another image field 240 formed by Lissajous scanning pattern with frequency ratio between the horizontal and the vertical scanning equals to 52:51. The light beam can be switched off in the perimeter of the scan pattern to divide the image field 150 into a dark field 151 and an active image field 152. However, it is impossible to generate a flat scan line within the dark field 151 because the frequencies of the horizontal scan and the vertical scan are close to each other. In this case, the two crossover locations of any half horizontal scan cycle will not be located close to each other within the dark field 151. Positioning a sensor in any location other than the center or the horizontal extreme near the vertical extreme of the image field will have difficulty to detect the crossover of the light beam using the technique discussed above.

Figure 10:
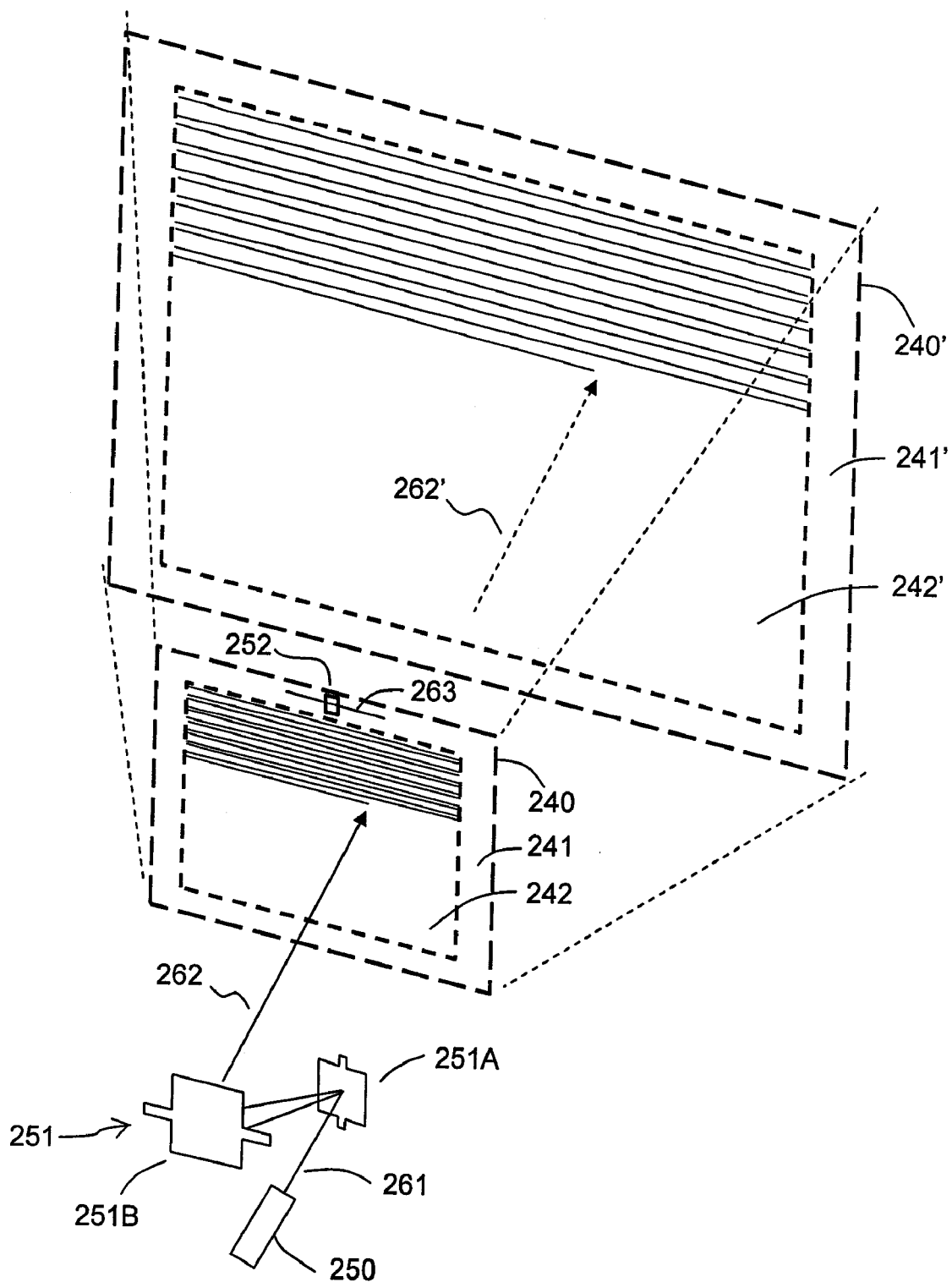
FIG. 10 is a perspective view of a projection display apparatus according to the second embodiment of the present invention.

FIG. 10 shows a perspective view of a projection apparatus consisting of a light source 250, a modulation means (not shown) for modulating the intensity of the light beam 261, beam scanners 251A, 251B and a sensor 252 positioned at a distance from the beam scanners 251A, 251B according to the second embodiment of the present invention. The light beam 261 generated by a light source 250 is deflected by a first beam scanners 251A to scan horizontally then deflected by a second beam scanner 251B to scan vertically in order to project and scan over a two dimensional image field 240. The image field 240 is divided in to a dark field 241 by switching off the light beam in the perimeter of the image field 240 and an active image field 242 for displaying projected image. Although the display apparatus according to FIG. 10 uses two single axis beam scanners 251A, 251B, a dual axis beam scanner with its deflection axes arranged in orthogonal directions may be used to replace the two single axis beam scanners 251A, 251B as in the configuration shown in FIG. 4. A sensor 252, such as a photodiode or a silicon PIN diode, operable to detect the scanned light beam is positioned along the center of the horizontal deflection span but outside the active image field 240 at a distance from the beam scanners 251A, 251B. A feedback scan line 263 is generated by switching on the light beam for a specific period of time within the dark field 241 to sweep over the sensor 252 for detection of the crossover of the horizontal scanning once per image frame. The feedback scan line 263 can be blocked by various measures inside the projection apparatus such that it will not be visible on the projected active image field 242' outside the projection apparatus.

Figure 11:
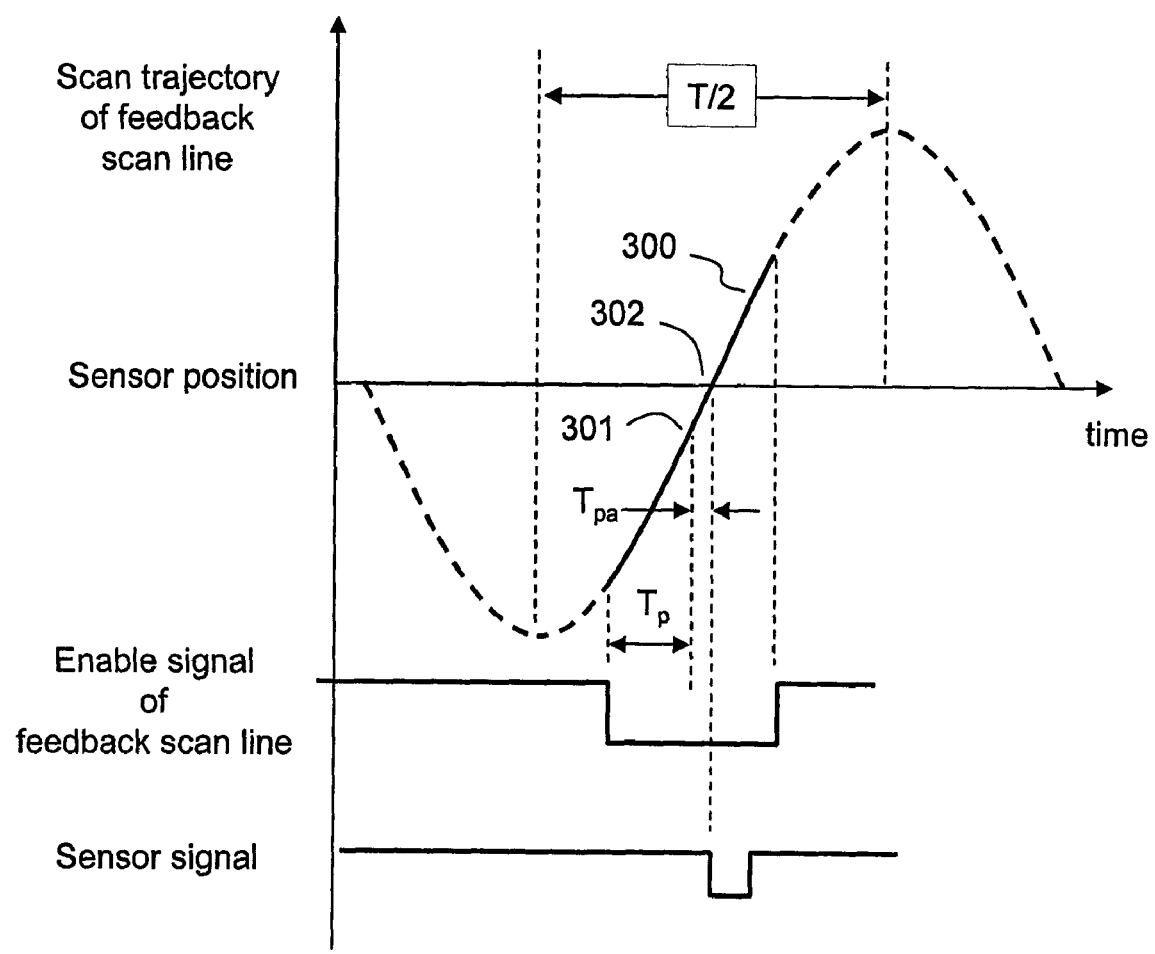
FIG. 11 illustrates a technique to detect the crossover of the light beam according to the configuration of the display apparatus as shown in FIG. 10.

FIG. 11 illustrates a technique to detect the crossover of the light beam according to the configuration of the display apparatus as shown in FIG. 10. The light beam will be switched on if the enable signal is in low level and vice versa. A feedback scan line 300, depicted by solid line in FIG. 11, is generated for less than or equal to a half period of the horizontal scan cycle by pulling the enable signal to low level starting from a predetermined timing $T_p$ ahead of the predicted crossover 301 to ensure the light beam will be switched on while passing through the center of the horizontal deflection span. A sensor capable of detecting scanned light beam is positioned along the center of the horizontal deflection span. An electrical pulse signal is generated from the sensor when the feedback scan line 300 passes through the sensor. The phase difference between the predicted crossover 301 and the actual crossover 302 of the light beam is defined as $T_{pa}$ and can be determined based on the falling edge of the sensor signal. The phase error $T_{pa}$ will be compensated once per image frame and the light beam location can be accurately predicted along its sinusoidal trajectory to generate image pixels on the right locations.

Figure 12A:
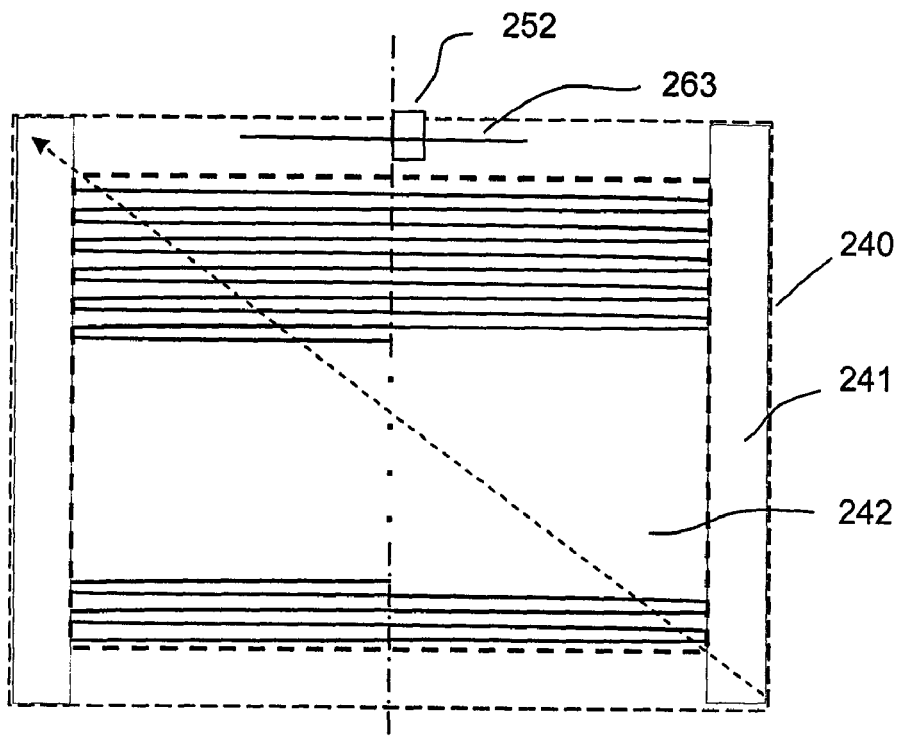
FIG. 12A illustrates a plan view of an image field formed by raster scan pattern with a sensor and a feedback scan line for compensating the phase error between the predicted and actual crossover of the light beam according to the technique illustrated in FIG. 11.

FIG. 12A illustrates a plan view of an image field 240 formed by deflecting a light beam in raster scan pattern with a sensor 252 and a feedback scan line 263 for compensating the phase error between the predicted and actual crossover of the light beam according to the technique illustrated in FIG. 11. The sensor is positioned along the center of the horizontal deflection span and outside the active image field 242 with at least some of its sensing area located within the dark field 241. The feedback scan line 263 is generated by switching on the light beam for less than or equal to half of a horizontal scan cycle within the dark field 241 and across the center of the horizontal deflection span to ensure it will shine on the sensor 252. Actual crossover of the light beam can be detected once per image frame based on the sensor signal generated by the feedback scan line 263.

Figure 12B:
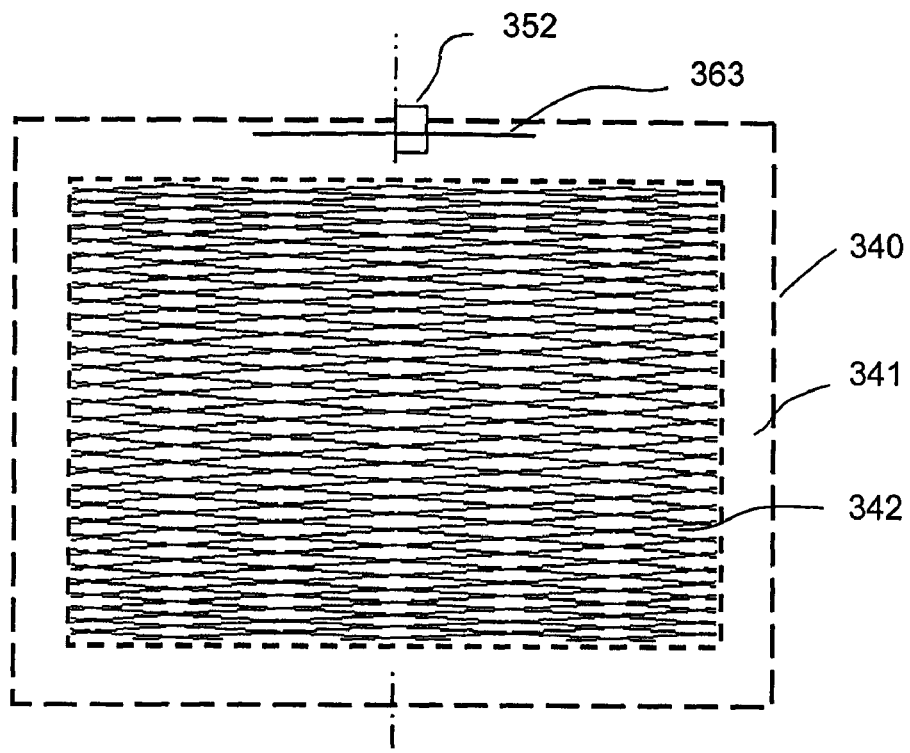
FIG. 12B illustrates a plan view of an image field formed by Lissajous scan pattern with a sensor and a feedback scan line for compensating the phase error between the predicted and actual crossover of the light beam according to the technique illustrated in FIG. 11.

FIG. 12B illustrates a plan view of an image field 340 formed by deflecting a light beam in Lissajous scanning pattern with a sensor 352 positioned along the center of the horizontal span and a feedback scan line 363 generated within the dark field 341 in order to detect the actual crossover of the light beam based on the technique illustrated in FIG. 11. The Lissajous pattern, similar to the one described in FIG. 8 consists of sinusoidal scanning motions on both the horizontal and the vertical directions with frequencies ratio of 52:5. The sensor is positioned along the center of the horizontal deflection span and outside the active image field 342 with at least some of its sensing area located within the dark field 341. Due to the high frequency ratio, the horizontal scan lines near the vertical extremes of the image field 340 are nearly flat so the feedback scan line 363 can be generated within the dark field 341 by switching on the light beam for less than or equal to half of a horizontal scan cycle to scan across the center of the horizontal deflection span and to shine on the sensor 352. Actual crossover of the light beam can be detected once per image frame based on the sensor signal generated by the feedback scan line 363.

Figure 13:
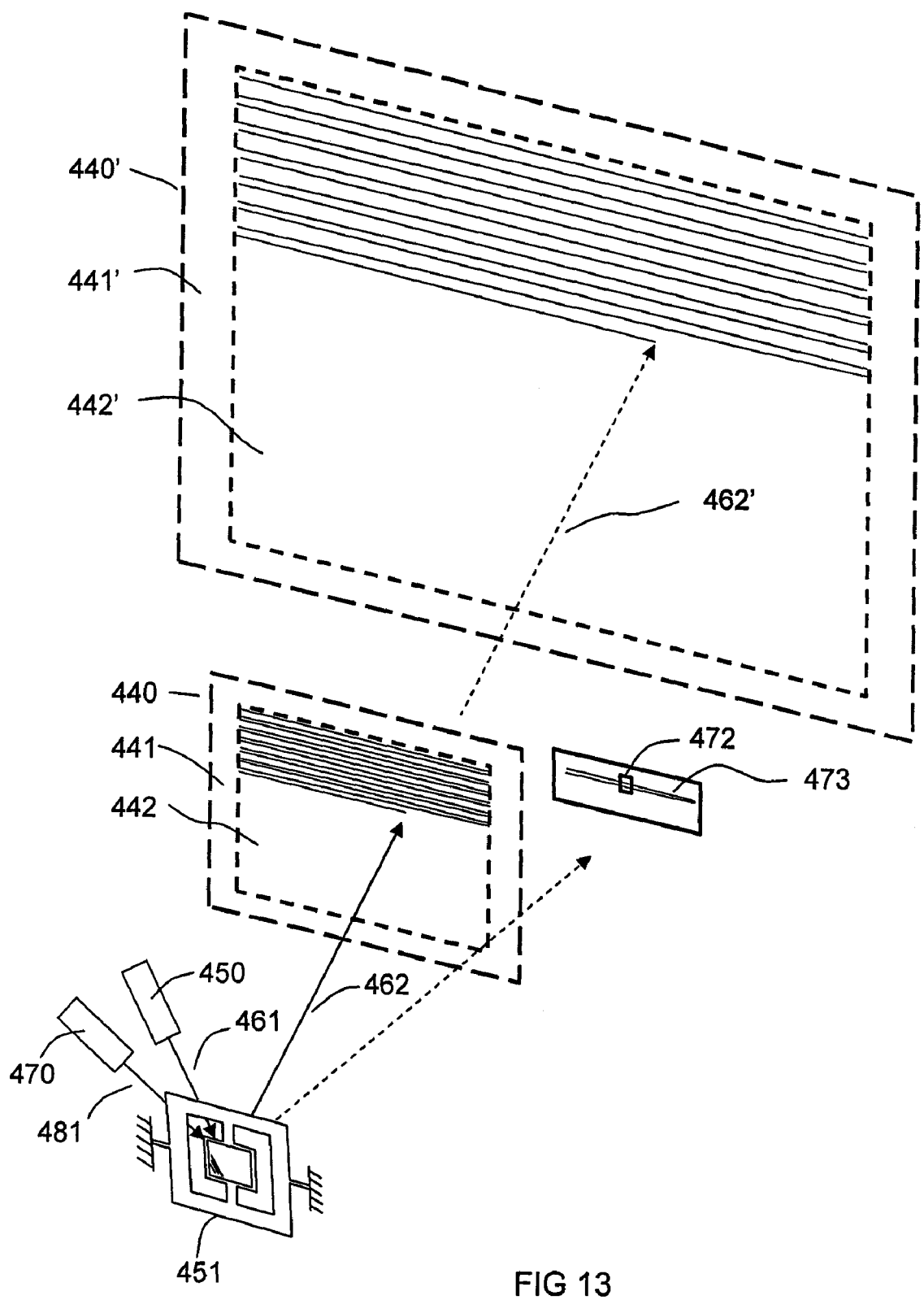
FIG. 13 is a perspective view of a projection display apparatus according to another embodiment of the present invention.

FIG. 13 illustrates a perspective view of a projection display apparatus according to another embodiment of the present invention. A light beam 461 generated by a light source 450 is deflected abut two deflection axes of a beam scanner 451 to scan over an image field 440 in either raster scan or Lissajous scan patterns at a distance from the beam scanner 451. The image field is divided into a dark field 441 and an active image field 442 by switching off the light beam 461 in the perimeter of the image field 440 to reduce inherent image defects. An additional light source 470, arranged to have different incident angle from light source 450 to the beam scanner 451, is switched on to generate light beam 481 for a specific period of time such that only a feedback scan line 473 is generated once per image frame and is located outside the active image field 442. A sensor 472 is positioned such that the feedback scan line 473 passes through its sensing area to generate electrical signal pulse and the feedback scan line 473 is blocked to be invisible outside the display apparatus. The light beam 481 may have wavelength invisible to human eyes so the feedback scan line 473 will be invisible. The exact position of the sensor 472 may be arranged according to the techniques illustrated in FIG. 5A, 5B and FIG. 11 since the light beam 481 is deflected by the beam scanner 451 to have the same scanning pattern forming image field 440.

In an alternative configuration, light source 470 may be arranged such that the light beam 481 will be deflected by the backside of the beam scanner with the sensor 472 positioned accordingly to detect the generated feedback scan line 473 opposite to the image field 440.

Although several specific embodiments of the invention have been described, there are alterations and equivalents which fall within the scope of this invention. The following claims are intended to include all such alterations and equivalents without deviating from the spirit and scope of the invention.

What is claimed is:

1. A scanning projection apparatus with phase detection and compensation comprising:
    a light source for generating a light beam consisting of plural light beams having wavelengths of red, green and blue colors;
    a beam scanner which deflects the light beam about a first deflection axis at a first frequency and about a second deflection axis at a second frequency to project a two dimensional image field, wherein the deflected light beam is switched off in the perimeter of the image field, defined as a dark field, and the region inside the dark field is used for displaying a projected image and is defined as an active image field;
    a modulation means for modulating the intensity of the light beam according to the image to be projected; and,
    a sensor operable to detect if the deflected light beam is positioned near a vertical extreme of the dark field but outside the active image field at a distance from the beam scanner inside the projection apparatus such that at least part of its sensing area is disposed within the vertical extreme of the dark field,
    wherein the light beam is switched on near the vertical extreme of the dark field for a half period of the first frequency once per image frame to sweep over the sensor;
    wherein the method of detection and compensation of the phase difference between the actual and predicted positions of the deflected light beam comprising the following steps:
    first, determining and storing $T_{gap}$ by adjusting the phase difference such that there is no image distortion, $T_{delay}=0$, and measuring time intervals $D_f$ and $D_b$ during initial setup of the display apparatus $T_{gap}=T/2-(D_f+D_b)$; when $T_{delay}=0$;

second, determining the phase error $T_{delay}$ by measuring $D_f$ and $D_b$ once per image frame during operation of the projection apparatus $T_{delay}=\frac{1}{2}(D_f+D_b+T_{gap})-T/4$;

third, compensating the phase error by adjusting the modulation timing of the light beam by $T_{delay}$.
    wherein, $D_f$ is the time interval counting from the predicted first crossover to the falling edge of the first pulse signal and can be recorded, $D_b$ is the time interval counting from the predicted first crossover to the falling edge of the second pulse signal and can be recorded, $T_{delay}$ is the phase error or the time difference between the predicted crossover and the actual crossover and is to be determined, T/2 is a half period of the scan cycle, $T_{gap}$ is related to the width of the sensing area of the sensor and the spot diameter of the light beam.

2. The projection apparatus according to claim 1, wherein the beam scanner deflects the light beam about the first deflection axis in sinusoidal motion.

3. The projection apparatus according to claim 2, wherein the beam scanner deflects the light beam about the second deflection axis in sinusoidal motion, and the first and the second frequencies differ by more than an order of magnitude.

4. The projection apparatus according to claim 2, wherein the beam scanner deflects the light beam about a second deflection axis in a sawtooth motion.

5. The projection apparatus according to claim 1, wherein the sensor is a photodiode.

6. The projection apparatus according to claim 1, wherein the sensor is a dual-element photodiode.

7. The projection apparatus according to claim 1, wherein the sensor is positioned in location other than the center and the extremes of the scan span of the first deflection axis.

8. The projection apparatus according to claim 1, wherein the sensor is positioned with the edge of its sensing area aligned to the center of the scan span of the light beam about the first deflection axis.

9. The projection apparatus according to claim 1, wherein the scan line generated outside the active image field is switched on for equal to or less than a half period of the scan cycle about the first deflection axis to sweep over the sensor.

10. A projection display apparatus with phase detection and compensation for displaying an image comprising:
    a first light source for generating a first light beam consisting of plural light beams having wavelengths of red, green and blue colors;
    a second light source for generating a second light beam;
    a beam scanner which deflects the first and the second light beams about a first deflection axis at a first frequency and about a second deflection axis at a second frequency to project first and a second two dimensional image fields, respectively, wherein the deflected light beams are switched off in the perimeter of the image fields, defined as dark fields, and the region inside the first dark field is used for displaying a projected image and is defined as an active image field;
    a modulation means for modulating the intensity of the first light beam according to the image to be projected and for modulating the intensity of the second light beam; and,
    a sensor operable to detect the deflected second light beam is positioned near a vertical extreme of the second dark field but outside the second active image field formed by the second light source, at a distance from the beam scanner inside the projection apparatus such that at least part of its sensing area is disposed within the vertical extreme of the second dark field,
    wherein the second light beam is switched on near the vertical extreme of the second dark field for a half period of the first frequency once per image frame to sweep over the sensor;
    wherein the method of detection and compensation of the phase difference between the actual and predicted positions of the deflected light beams comprising the following steps:
    first, determining and storing $T_{gap}$ by adjusting the phase difference such that there is no image distortion, $T_{delay}=0$, and measuring time intervals $D_f$ and $D_b$ during initial setup of the display apparatus $T_{gap}=T/2-(D_f+D_b)$; when $T_{delay}=0$;

second, determining the phase error $T_{delay}$ by measuring $D_f$ and $D_b$ of the second light beam once per image frame during operation of the projection apparatus $T_{delay}=\frac{1}{2}(D_f+D_b+T_{gap})-T/4$;

third, compensating the phase error by adjusting the modulation timing of the light beams by $T_{delay}$.
    wherein, $D_f$ is the time interval counting from the predicted first crossover to the falling edge of the first pulse signal and can be recorded, $D_b$ is the time interval counting from the predicted first crossover to the falling edge of the second pulse signal and can be recorded, $T_{delay}$ is the phase error or the time difference between the predicted crossover and the actual crossover and is to be determined, T/2 is a half period of the scan cycle, $T_{gap}$ is related to the width of the sensing area of the sensor and the spot diameter of the second light beam.

11. The projection apparatus according to claim 10, wherein the first light source and the second light source are aligned such that the first and the second light beams have different incident angles to the beam scanner.

12. The projection apparatus according to claim 10, wherein the second light beam has wavelength invisible to human eyes.

13. The projection apparatus according to claim 10, wherein the beam scanner deflects the light beams about the first deflection axis in sinusoidal motion.

14. The projection apparatus according to claim 13, wherein the beam scanner deflects the light beams about the second deflection axis in sinusoidal motion, and the first and the second frequencies differ by more than an order of magnitude.

15. The projection apparatus according to claim 13, wherein the beam scanner deflects the light beams about a second deflection axis in a sawtooth motion.

16. The projection apparatus according to claim 10, wherein the sensor is a photodiode.

17. The projection apparatus according to claim 10, wherein the sensor is a dual-element photodiode.

18. The projection apparatus according to claim 10, wherein the sensor is positioned in location other than the center and the extremes of the scan span of the second light beam about the first deflection axis.

19. The projection apparatus according to claim 10, wherein the sensor is positioned with the edge of its sensing area aligned to the center of the scan span of the second light beam about the first deflection axis.

20. The projection apparatus according to claim 10, wherein the scan line of the second light beam generated outside the active image field is switched on for equal to or less than a half period of the scan cycle about the first deflection axis to sweep over the sensor.

* * * * *